United States Patent
Johnson et al.

(10) Patent No.: US 11,619,709 B2
(45) Date of Patent: Apr. 4, 2023

(54) OPTICAL SYSTEM TO REDUCE LOCAL INTERNAL BACKSCATTER

(71) Applicant: Raytheon Company, Waltham, MA (US)

(72) Inventors: Timothy P. Johnson, Waltham, MA (US); Matthew J. Klotz, Waltham, MA (US); Ian S. Robinson, Waltham, MA (US); Lacy G. Cook, Waltham, MA (US)

(73) Assignee: RAYTHEON COMPANY, Waltham, MA (US)

( * ) Notice: Subject to any disclaimer, the term of this patent is extended or adjusted under 35 U.S.C. 154(b) by 481 days.

(21) Appl. No.: 16/853,029

(22) Filed: Apr. 20, 2020

(65) Prior Publication Data
US 2021/0325668 A1    Oct. 21, 2021

(51) Int. Cl.
| | |
|---|---|
| *G01S 7/48* | (2006.01) |
| *G01S 7/481* | (2006.01) |
| *G02B 5/00* | (2006.01) |
| *G01S 17/00* | (2020.01) |

(52) U.S. Cl.
CPC .......... *G01S 7/4808* (2013.01); *G01S 7/4812* (2013.01); *G01S 17/006* (2013.01); *G02B 5/005* (2013.01)

(58) Field of Classification Search
USPC ....................................................... 356/4.01
See application file for complete search history.

(56) References Cited

U.S. PATENT DOCUMENTS

| | | |
|---|---|---|
| 5,192,978 A | 3/1993 | Keeler |
| 5,206,698 A | 4/1993 | Werner et al. |
| 5,767,519 A | 6/1998 | Gelbwachs |
| 5,831,762 A | 11/1998 | Baker et al. |
| 6,020,994 A | 2/2000 | Cook |
| 6,178,047 B1 | 1/2001 | Cook |

(Continued)

FOREIGN PATENT DOCUMENTS

WO    2019138961 A1    7/2019

OTHER PUBLICATIONS

International Search Report and Written Opinion from PCT Application No. PCT/US2020/063030 dated Mar. 16, 2021.

(Continued)

*Primary Examiner* — James R Hulka
(74) *Attorney, Agent, or Firm* — Burns & Levinson, LLP; Joseph M. Maraia

(57) ABSTRACT

A LADAR system includes a transmitter configured to emit a directed optical signal. The LADAR system includes a shared optical aperture through which the directed optical signal is emitted. The shared optical aperture includes a first pupil plane. The shared optical aperture receives a return optical signal that is based on the directed optical signal. The system includes a mirror with a hole through which the directed optical signal passes. The mirror also reflects the return optical signal towards an imager. The imager receives the return optical signal and generates an image. The image is based on a portion of the return optical signal. The system also includes a partial aperture obscuration at a second pupil plane. The partial aperture obscuration may block a portion of internal backscatter in the return optical signal. The system also includes a focal plane to record the image.

20 Claims, 3 Drawing Sheets

(56) References Cited

U.S. PATENT DOCUMENTS

| | | |
|---|---|---|
| 6,792,028 B2 | 9/2004 | Cook et al. |
| 6,963,354 B1 | 11/2005 | Scheps |
| 7,345,744 B2 | 3/2008 | Halmos et al. |
| 7,556,389 B2 | 7/2009 | Cook |
| 7,589,896 B2 | 9/2009 | Cook et al. |
| 7,648,249 B2 | 1/2010 | Cook |
| 7,656,526 B1 | 2/2010 | Spuler et al. |
| 7,741,618 B2 | 6/2010 | Lee et al. |
| 7,813,644 B2 | 10/2010 | Chen et al. |
| 8,203,472 B2 | 6/2012 | Robinson |
| 8,203,715 B2 | 6/2012 | Robinson |
| 8,269,950 B2 | 9/2012 | Spinelli et al. |
| 8,277,060 B2 | 10/2012 | Cook |
| 8,338,785 B2 | 12/2012 | Ray |
| 8,536,503 B2 | 9/2013 | Cook et al. |
| 8,543,009 B2 | 9/2013 | Bulot et al. |
| 8,577,182 B1 | 11/2013 | Robinson |
| 8,759,735 B2 | 6/2014 | Cook et al. |
| 8,792,163 B2 | 6/2014 | King et al. |
| 8,767,187 B2 | 7/2014 | Coda et al. |
| 8,787,768 B2 | 7/2014 | Klotz et al. |
| 8,801,202 B2 | 8/2014 | Cook |
| 8,824,055 B2 | 9/2014 | Cook |
| 8,947,647 B2 | 2/2015 | Halmos et al. |
| 9,121,758 B2 | 9/2015 | Cook |
| 9,151,958 B2 | 10/2015 | Robinson |
| 9,166,686 B2 | 10/2015 | Cook |
| 9,236,703 B2 | 1/2016 | Filgas et al. |
| 9,279,724 B2 | 3/2016 | Robinson et al. |
| 9,365,303 B2 | 6/2016 | Robinson |
| 9,404,792 B2 | 9/2016 | Shimon et al. |
| 9,500,518 B2 | 11/2016 | Cook |
| 9,658,337 B2 | 5/2017 | Ray et al. |
| 9,922,251 B2 | 3/2018 | Robinson |
| 10,392,136 B2 | 8/2019 | Leatham et al. |
| 10,520,437 B1 | 12/2019 | Stebbins et al. |
| 10,809,517 B2 * | 10/2020 | Johnson .................. G02B 5/30 |
| 2003/0179804 A1* | 9/2003 | Cook .................. G02B 26/106 |
| | | 372/100 |
| 2005/0249502 A1* | 11/2005 | Chen .................. G02B 27/4211 |
| | | 398/118 |
| 2006/0231771 A1* | 10/2006 | Lee .......................... G01S 17/95 |
| | | 250/458.1 |
| 2006/0279723 A1* | 12/2006 | Halmos .................. G01S 17/34 |
| | | 356/5.1 |
| 2007/0229994 A1* | 10/2007 | Cook .................. G02B 17/0652 |
| | | 359/872 |
| 2008/0210881 A1 | 9/2008 | Harris et al. |
| 2008/0266663 A1* | 10/2008 | Cook .................... H01S 3/0057 |
| | | 359/566 |
| 2009/0109561 A1* | 4/2009 | Cook .................. G02B 26/0816 |
| | | 359/857 |
| 2009/0237784 A1* | 9/2009 | Cook .................. G02B 26/0816 |
| | | 359/430 |
| 2010/0026981 A1* | 2/2010 | Spinelli .................. G01S 17/95 |
| | | 356/4.01 |
| 2010/0188762 A1* | 7/2010 | Cook .................. G02B 27/0927 |
| | | 359/858 |
| 2010/0290053 A1* | 11/2010 | Robinson .................. G01J 3/02 |
| | | 356/451 |
| 2011/0228386 A1* | 9/2011 | King .................. G02B 26/0816 |
| | | 359/399 |
| 2011/0299849 A1* | 12/2011 | Klotz .................. H04B 10/073 |
| | | 398/115 |
| 2012/0057133 A1* | 3/2012 | Robinson ................ G03B 35/26 |
| | | 359/465 |
| 2012/0068866 A1* | 3/2012 | Robinson ............ H03M 1/0836 |
| | | 341/118 |
| 2012/0141141 A1* | 6/2012 | Bulot .................. H04B 10/5165 |
| | | 398/182 |
| 2012/0274938 A1* | 11/2012 | Ray ........................ B64D 15/20 |
| | | 356/342 |
| 2012/0292482 A1* | 11/2012 | Cook ...................... F41G 3/145 |
| | | 359/846 |
| 2013/0105671 A1* | 5/2013 | Cook .................... G02B 27/646 |
| | | 250/216 |
| 2013/0114627 A1* | 5/2013 | Filgas ................ H01S 3/10061 |
| | | 372/21 |
| 2013/0148095 A1* | 6/2013 | Coda ........................ G01S 17/58 |
| | | 356/27 |
| 2013/0148103 A1* | 6/2013 | Halmos .................. G01S 17/26 |
| | | 356/5.09 |
| 2013/0293413 A1* | 11/2013 | Robinson ................ B64G 3/00 |
| | | 342/357.66 |
| 2014/0139926 A1* | 5/2014 | Cook ................ G02B 27/1013 |
| | | 359/639 |
| 2014/0226968 A1* | 8/2014 | Cook .................. G02B 17/0636 |
| | | 398/9 |
| 2014/0379263 A1* | 12/2014 | Ray ........................ G01S 7/4802 |
| | | 702/3 |
| 2015/0001381 A1* | 1/2015 | Shimon ...................... G01J 1/04 |
| | | 250/216 |
| 2015/0028194 A1* | 1/2015 | Cook ...................... G01S 17/86 |
| | | 250/216 |
| 2015/0369667 A1* | 12/2015 | Robinson ............. G01J 3/0202 |
| | | 356/451 |
| 2016/0223394 A1* | 8/2016 | Cook ...................... G02B 27/64 |
| 2018/0053038 A1* | 2/2018 | Robinson ............ G06V 10/443 |
| 2019/0084698 A1* | 3/2019 | Leatham .................. B64G 1/64 |
| 2019/0113735 A1 | 4/2019 | Johnson |

OTHER PUBLICATIONS

International Preliminary Report on Patentability for International Application No. PCT/US2020/063030, dated Nov. 3, 2022, (8 pages).

\* cited by examiner

OPTICAL SYSTEM TO REDUCE LOCAL INTERNAL BACKSCATTER

TECHNICAL FIELD

This specification describes examples of optical systems having a partial aperture obscuration to block at least some local internal backscatter in an optical signal.

BACKGROUND

Laser detection and ranging (LADAR) or light detection and ranging (LIDAR) systems use a pulse of light to measure distance. By pulsing a transmitter, such as a laser emitter, a burst of light is emitted, which may be focused through a lens or lens assembly. The burst of light travels downrange to a field and reflects therefrom, returning to a focal plane in the LADAR or LIDAR system. The time it takes for the pulse of light to return to the focal plane may be measured, and a distance may be derived based on the timing measurement.

SUMMARY

An example LADAR system includes a transmitter configured to emit a directed optical signal. The LADAR system includes a shared optical aperture through which the directed optical signal is emitted. The shared optical aperture includes a first pupil plane. The shared optical aperture receives a return optical signal that is based on the directed optical signal. The LADAR system also includes a mirror with a hole through which the directed optical signal passes. The mirror also reflects the return optical signal towards an imager. The imager receives the return optical signal and generates an image of an intended scene and target. The image is based on a portion of the return optical signal. The system also includes a partial aperture obscuration at a second pupil plane. The second pupil plane is an optical conjugate of the first pupil plane. The partial aperture obscuration may block a portion of internal backscatter in the return optical signal. The system also includes a focal plane to record the image. The image may have at least a portion of internal backscatter blocked. The partial aperture obscuration is between the imager and the focal plane. The example LADAR system may include one or more of the following features, either alone or in combination.

The transmitter configured to emit a directed optical signal may include a laser. A shape of the partial aperture obscuration may be based on a shape of a hole. A location of the partial aperture obscuration may be based on a location of a hole. A size of the partial aperture obscuration may be based on a size of a hole. The hole may be off-center relative to a plane of the mirror and the partial aperture obscuration may be off-center relative to a cross-section of an optical path of the return optical signal. The hole may be centered related to a plane of the mirror and the partial aperture obscuration may be centered relative to a cross-section of an optical path of the return optical signal.

The internal backscatter may include near-field backscatter. The mirror having a hole may be an optical conjugate of the first pupil plane. The mirror having a hole may be an optical conjugate of the second pupil plane. The LADAR system may also include an afocal foreoptic. The afocal foreoptic may increase the optical aperture size and decrease the directed optical signal divergence.

An example method obscures local internal backscatter within a laser detection and ranging system. The method includes emitting a directed optical signal through a hole in a mirror. The directed optical signal passes through a shared optical aperture. The shared optical aperture includes a first pupil plane. The method includes receiving a return optical signal through the shared optical aperture. The method includes removing at least some internal backscatter in the return optical signal by positioning a partial aperture obscuration in a second pupil plane. The second pupil plane is optically conjugate to the first pupil plane. The method includes recording an image at a focal plane based on the return optical signal. The image may have at least some internal backscatter removed. The example method may include one or more of the following features, either alone or in combination.

The shape of the partial aperture obscuration may be based on a shape of the hole. The location of the partial aperture obscuration may be based on a location of the hole. A size of the partial aperture obscuration may be based on a size of the hole. The hole may be off-center relative to a plane of the mirror and the partial aperture obscuration may be off-center relative to a cross-section of an optical path of the return optical signal. The hole may be centered related to a plane of the mirror and the partial aperture obscuration may be centered relative to a cross-section of an optical path of the return optical signal.

The mirror may be an optical conjugate of the second pupil plane. The optical aperture size may be increased using an afocal foreoptic. The directed optical signal divergence may be decreased using an afocal foreoptic.

Any two or more of the features described in this specification, including in this summary section, may be combined to form implementations not specifically described in this specification.

The details of one or more implementations are set forth in the accompanying drawings and the following description. Other features and advantages will be apparent from the description and drawings, and from the claims.

DESCRIPTION OF THE DRAWINGS

Like reference numerals in different figures indicate like elements.

DETAILED DESCRIPTION

Figure 1:
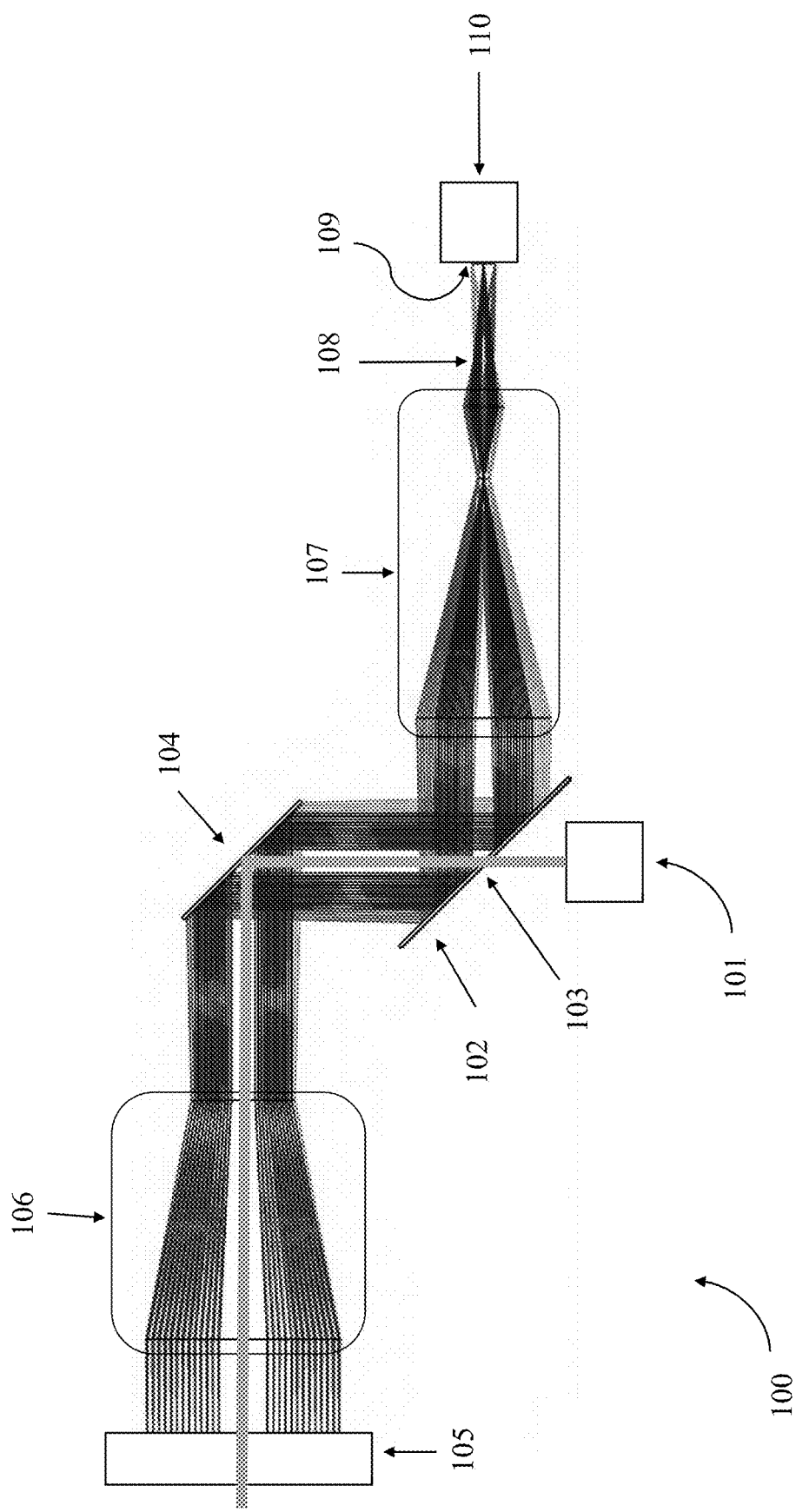
FIG. 1 is a block diagram of an example shared optical aperture LADAR system.

An example active sensing optical system, such as a LIDAR or LADAR system, transmits light to a target and receives light back from the target. The transmitted light is also referred to herein as a directed optical signal and the received light is also referred to as a return optical signal. In an active sensing optical system, the transmitted light is separated from the received light. In some systems, the beam diameter of the transmitted light can be less than the beam diameter of the received light. For example, the beam diameter of the transmitted light may be 0.05 to 0.50 times the beam diameter of the received light. A way to separate the transmitted light from the received light in such systems includes using a mirror having a hole. The transmitted light passes through the hole and the received light reflects off the mirror and proceeds along an optical path to a focal plane of a receiver detector or detectors.

One challenge in LADAR and LIDAR systems is to align the transmitted light and the received light while avoiding signal from the transmitted light scattering into the received light due to internal scatter within the optical transceiver system. The example systems described herein include techniques for using a common optical system to transmit and receive signals while preventing transmitted light that is retroreflected and/or scattered at an angle from reaching the receiver detector. In such example systems, light that is retroreflected passes back through the hole, avoiding the receiver detector. Light that is scattered at an angle is blocked by an obscuration. The optical configuration prevents the receiver detector from directly seeing all or part of the hole in the mirror and from directly seeing all or part of the transmitted light scattering from optical surfaces forward of the mirror. The systems include imaging optics that image or relay and, therefore, are referred to as an imager. The imager focuses the received light onto the receiver detector. Also, the imager forms an image prior to forming a final image at the receiver detector. The imager can generate an opportune location in the optical path that may be conjugate to the hole in the mirror, and thus provides a location where an aperture or mask, such as a partial aperture obscuration, can be placed. The partial aperture obscuration blocks scatter from reaching the detector while not blocking signal returning from outside the optical system. The partial aperture obscuration functions to shield the receiver detector from seeing all or part of: the hole in the mirror, forward optical surfaces illuminated by the transmitted light, or both the hole in the mirror and the illuminated forward optical surfaces.

In an example, the partial aperture obscuration is projected forward to all optical surfaces ahead of the mirror, but does not substantially obscure the received light from the focal plane. This is because that portion of those surfaces is only used by the transmitted light and any received light using that blocked portion would (to first order) pass back through the hole. The transmitted light that is directly scattered back in the direction of the receiver detector from the portion of the optics used in the transmission path will be blocked. Secondary scatter of that light may not be blocked. That is, light that is scattered from an optical element and then subsequently scattered again from another surface, may not be in the "shadow" of the mask or obscuration in some cases.

Accordingly, described herein are example optical systems, such as LIDAR or LADAR systems, that are configured to reduce local internal backscatter in an optical signal. The optical systems use a partial aperture obscuration (or simply, obscuration) to block at least some of the local internal backscatter, as described herein.

In an example optical system, a transmitter, such as a laser source, emits a directed optical signal. A laser beam is an example of a directed optical signal. The directed optical signal passes through a hole in a mirror, and ultimately, through a shared optical aperture. An optical aperture includes an opening through which light passes. An optical aperture is shared if it allows light to pass in two directions.

The directed optical signal is output through the shared optical aperture to a beam field. The beam field includes a scene representative of a real-world space and a target of the optical signal is in the scene. The directed optical signal is reflected from the scene and target back to the shared optical aperture. This reflected signal is the return optical signal. The optical system receives the return optical signal through the shared optical aperture. Thus, the directed optical signal and return optical sign travel a common optical path through the shared optical aperture. This common optical path may reduce the number of components in the optical system.

The return optical signal may contain internal backscatter. Backscatter includes scattered light in the return optical signal. Backscatter is internal when it is generated by a component in that optical system, such as an optical aperture, rather than from the beam field. Internal backscatter includes local internal backscatter. The obscuration is arranged within a path of the optical signal to block at least some of the local internal backscatter in the return optical signal from reaching the focal plane. For example, transmitted light that is directly scattered back in the direction of the receiver detector from the portion of the optics included in the transmission path may be blocked. In addition, the obscuration will block at least part of the focal plane from seeing all or part of the hole.

FIG. 1 is a block diagram of an example shared optical aperture LADAR system 100. System 100 includes an optical transmitter 101. Transmitter 101 is configured to output a laser beam which, as noted, is a type of directed optical signal. An example laser beam includes a spatially-coherent beam of light. Types of transmitters that may be used include a solid-state laser, a fiber laser, a gas laser, a chemical laser, an excimer laser, a photonic crystal laser, a semiconductor laser, a dye laser, or a free-electron laser. The laser may be configured or controlled to output ultraviolet, visible, or near infrared light to image targets in a scene.

LADAR system 100 includes a mirror 102. The mirror is configured to separate transmitted light from received light. To this end, mirror 102 includes a hole 103 that the laser beam may pass through. The hole can be located at any appropriate location on the mirror, including a plane of the mirror. The hole extends all the way through the mirror. By including a hole 103, transmitted light that is retroreflected may pass back through the hole 103. The mirror 102 also includes a reflective surface on an area that surrounds the hole. The reflective surface reflects a return optical signal received by the mirror.

LADAR system 100 may also include a fold mirror 104. Fold mirror 104 may be configured and arranged to direct the laser beam received through the hole towards a shared optical aperture 105 for output to a scene and target. Depending on the configuration of the system, the fold mirror 104 may be omitted or more than one fold mirror 104 may be included to direct the laser beam.

An afocal foreoptic 106 may be included between fold mirror 104 and shared optical aperture 105. Afocal foreoptic 106 may be configured to change the optical properties of the return optical signal, as described below. Depending on the configuration of the system, the afocal foreoptic 106 may be omitted or more than one afocal foreoptic 106 may be included change the optical properties of the return optical signal.

From the afocal foreoptic 106, the laser beam passes through shared optical aperture 105. As explained above, an optical aperture includes an opening through which light passes to a beam field that includes a scene and target. Shared optical aperture 105 is configured to transmit the laser beam to the scene and target and to receive a return optical signal that is based on the transmitted laser beam. In this regard, shared optical aperture 105 may be configured to receive the return optical signal at a particular angle and brightness based the diameter of an opening in the shared optical aperture. Similarly, the shared optical aperture 105 may be configured to alter the angle of an emitted laser beam. Shared optical aperture 105 may include a transmissive optical device, such as a window or lens, which converges or disperses the transmitted laser beam through refraction.

The beam field includes a scene that is representative of a real-world space. As explained above, the beam field also includes a target in the scene of the beam field. The laser beam focuses on, and scans across, points in the scene and target. An operator of the LADAR system 100 may adjust the LADAR system 100 to control the scanning and to set the beam field containing the scene and target.

For example, the laser beam may illuminate a spot on the target. The laser beam reflects from the target to produce the return optical signal. The return optical signal may represent multiple fieldpoints of the target. A fieldpoint includes features on the target that are illuminated by the laser beam. Scattered light may also be included in the return optical signal. Shared optical aperture 105 receives the return optical signal at a first pupil plane. The first pupil plane includes a location in shared optical aperture 105 where footprints of the return optical signal fieldpoints are in a single plane.

Internal backscatter may be produced in the return optical signal due to scattering or reflection caused by shared optical aperture 105. For example, shared optical aperture 105 may include imperfections due to deterioration or environmental exposure. A lens or other glass included in the shared optical aperture 105 may include such imperfections. Imperfections may also be present in other system optical components. Thus, internal backscatter may also be produced in the return optical signal due to scattering or reflection caused by optical components in system 100 other than the shared optical aperture. For example, transmitted light that is directly scattered back in the direction of a receiver detector from the portion of the optics used in the transmission path may cause internal backscatter. As mentioned above, internal backscatter includes local internal backscatter.

The return optical signal is received by afocal foreoptic 106. Afocal foreoptic 106 may increase the shared optical aperture 105 size. Afocal foreoptic 106 may also decrease the directed optical signal beam divergence. As such, range performance of LADAR system 100 may be enhance. The focused return optical signal may then reflect from fold mirror 104 and subsequently reflect from mirror 102 towards focal plane 109. As mentioned previously, hole 103 in mirror 102 and all of its forward projections, along with shared optical aperture 105, fold mirror 104, and afocal foreoptic 106, may contribute to local internal backscatter. In this regard, local internal backscatter may be greater on the forward projections of the hole in some cases. For example, if hole 103 is centered on mirror 102, and the laser beam travels through the shared optical aperture centrally, backscatter may be greater at the projection of the hole in the optical path.

The reflective surface of mirror 102 reflects the return optical signal towards imager 107, as described above. Imager 107 receives the return optical signal and focuses the return optical signal intermediately. Imager 107 may include a series of optics to generate an image of the scene and target on focal plane 109 based on the return optical signal. The imager 107 may also form a second pupil plane. The second pupil plane is an optical conjugate of the first pupil plane such that fieldpoints at the first pupil plane are also present at the second pupil plane. An optical conjugate may include image or object pairs. Optical elements between conjugates create an imaging relationship such that light which crosses one conjugate will recross at the other conjugate. If a point source is identified at one optical conjugate, an image of that point source may be at the other optical conjugate. Likewise, if a point source identified at a second optical conjugate, an image of the point source may be at the other optical conjugate.

The second pupil plane may also be an optical conjugate to hole 103 in mirror 102. Accordingly, the second pupil plane may present at least some of the local internal backscatter at a predictable location based on the location of hole 103.

Consequently, a partial aperture obscuration 108 may be positioned at the second pupil plane. Examples of partial aperture obscurations are described below with respect to FIG. 3. The partial aperture obscuration 108 may be a physical stop or block, and may have any appropriate shape or size. In this regard, the partial aperture obscuration 108 may have a shape that overlaps with a portion of the second pupil plane to block all or some local internal backscatter. The partial aperture obscuration 108 may have a shape that resembles the shape of hole 103 such that local internal backscatter in the forward projection of the hole is blocked from focal plane 109. In this regard, local internal backscatter may be greater within the optical path of the laser beam. Because the partial aperture obscuration may be located in the optical path at a forward projection of hole 103, at least some local internal backscatter in the optical path may be blocked from reaching the focal plane 109.

In an example, the partial aperture obscuration 108 may be sized and shaped to block all or part of the forward projection of hole 103 towards focal plane 109. In this example, partial aperture obscuration 108 is positioned at the second pupil plane, disposed between imager 107 and focal plane 109. While the partial aperture obscuration 108 reduces backscatter, consistent return signal throughput is maintained when the partial aperture obscuration 108 matches the hole 103 size, shape, and location. This is because the partial aperture obscuration 108 may be configured only to block forward projections of the hole 103 described below. Thus, the obscuration enables consistent return signal throughput.

Focal plane 109 records the image of the scene and target generated by the imager based on the return optical signal. Due to the partial aperture obscuration 108, all or some of the local internal backscatter is blocked. As a result, the quality of the image may be improved relative to images produced without the obscuration. Focal plane 109 may be a component of a detector 110, camera, or other optical recording device.

Figure 2:
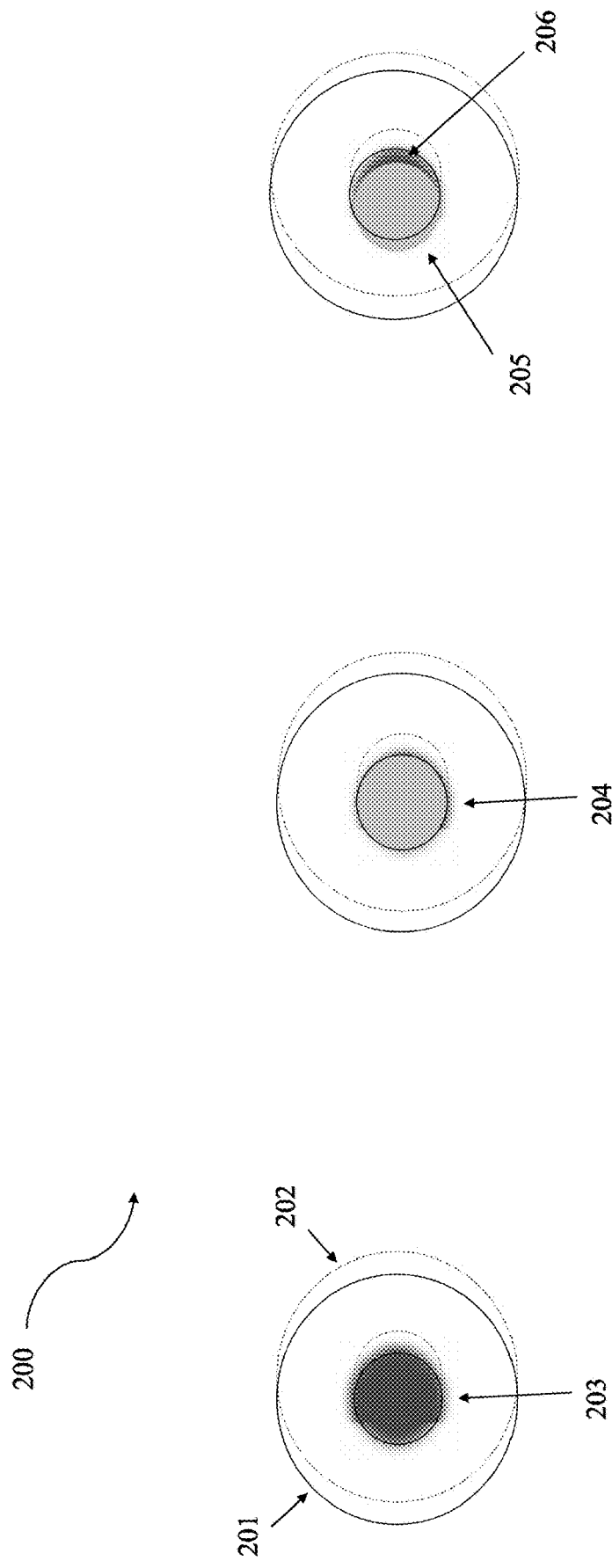
FIG. 2 shows examples of return optical signal cross-sections.

FIG. 2 shows examples of return optical signal cross-sections 200. A return optical signal cross-section may include the field of view of a focal plane. The field of view of a focal plane is bound by a field of view footprint center pixel 201 and a field of view footprint edge pixel 202. As described above, in a shared optical aperture LADAR system, local internal backscatter 203 produced by forward optics may be present. Employing a partial aperture obscuration 204 blocks the local internal backscatter from reaching a focal plane field of view. Employing a partial aperture obscuration 205, though not positioned at the second pupil plane, may block some local internal backscatter 206, but may also lower return optical signal throughput to a focal plane. This is because the partial aperture obscuration 205 is not located optically conjugate the hole in the mirror nor the first pupil plane. As such, the partial aperture obscuration 204 is positioned at the second pupil plane.

Figure 3:
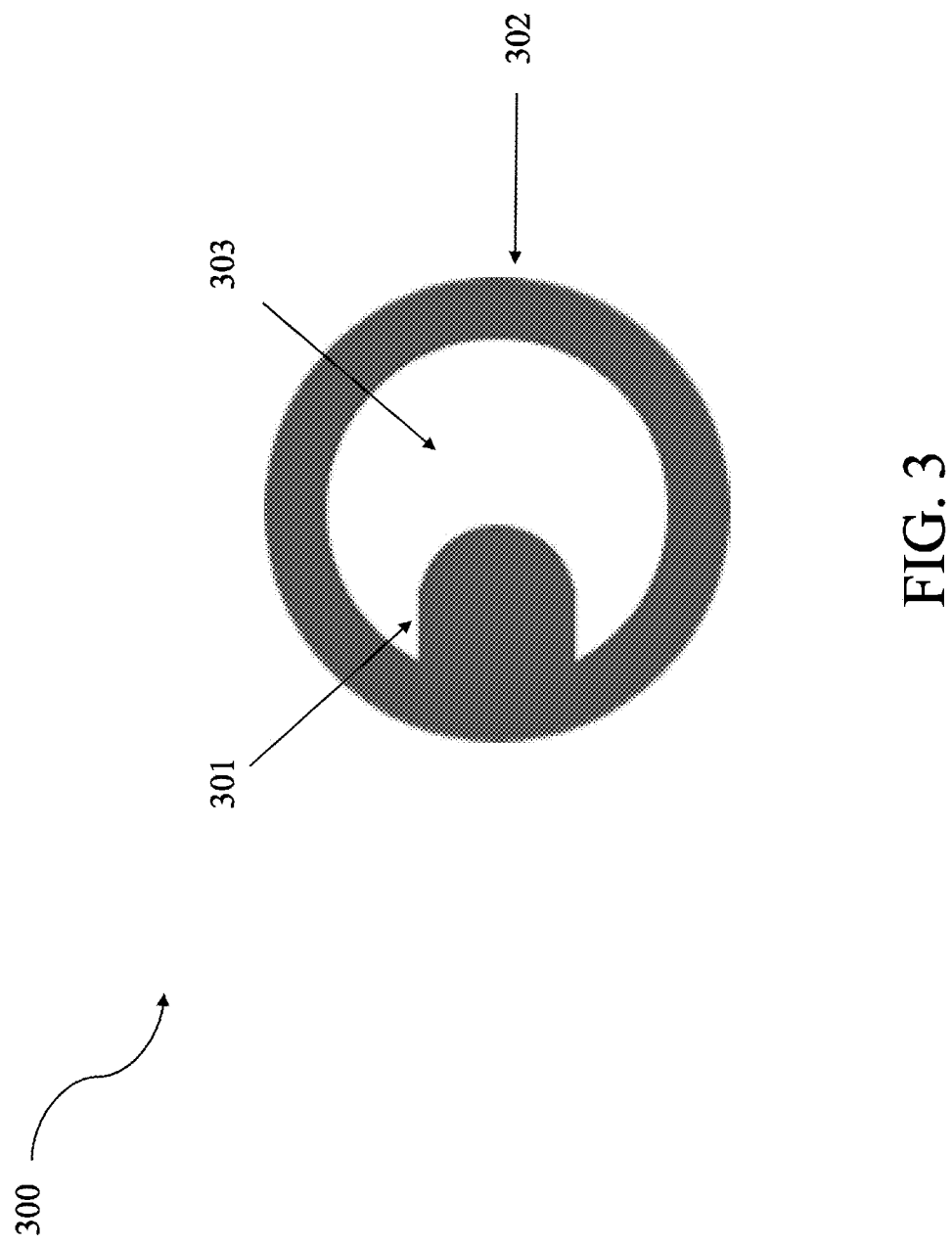
FIG. 3 is a front view of an example apparatus to block local internal backscatter.

FIG. 3 is a front view of an example apparatus to block local internal backscatter 300. A partial aperture obscuration 301 is positioned in an optical path that a return optical signal travels 303. The partial aperture obscuration 301 may be mounted to a supporting structure 302. An example of a supporting structure 302 may be a ring. As mentioned before, the partial aperture obscuration 301 shape or size may be based on the shape or size of the hole in the mirror. For example, the shape of the partial aperture obscuration may be identical to the shape of the hole. For example, the size of the partial aperture obscuration 301 may be identical to the size of the hole. For example, the size or shape of the partial aperture obscuration 301 may be identical to the size or shape of a projection of the hole at the second pupil plane. As explained herein, by basing the shape, size, and/or location of the partial aperture obscuration 301 on the shape, size, and/or location of the hole location, all or some local internal backscatter in return optical signal 303 may be blocked from reaching a focal plane.

For example, the hole in the mirror may be circular and the partial aperture obscuration 301 may be circular. The hole may have the same radius as the partial aperture obscuration 301. The shapes of the partial aperture obscuration 301 and the hole in the mirror are not limited to circular but rather may have any appropriate shape, such as oval, polygonal, rectangular, and so forth.

The partial aperture obscuration 301 location relative to a cross section of an optical path 303 may be based on the location of the hole in the mirror. The partial aperture obscuration 301 location relative to a cross section of an optical path 303 may be based on the circumference of the supporting structure 302. The partial aperture obscuration 301 location relative to a cross section of an optical path 303 may be based on the second pupil plane.

In the example of FIG. 3, partial aperture obscuration 301 may be off-center relative to a cross section of an optical path 303, off-center relative to the circumference of the supporting structure 302, or off-center relative to the second pupil plane. Similarly, the hole in the mirror, in such an example, may be off-center in the mirror.

In another example, the partial aperture obscuration 301 may be centered relative to a cross section of an optical path 303, centered relative to the circumference of the supporting structure 302, or centered relative to the pupil plane to match the hole in the mirror where the hole is centered.

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

Other implementations not specifically described in this specification are also within the scope of the following claims.

What is claimed is:

1. A laser detection and ranging system comprising:
   a transmitter configured to emit a directed optical signal;
   a shared optical aperture through which the directed optical signal is emitted, the shared optical aperture comprising a first pupil plane, the shared optical aperture also to receive a return optical signal that is based on the directed optical signal;
   a mirror having a hole through which the directed optical signal passes, the mirror also to reflect the return optical signal towards an imager;
   the imager to receive the return optical signal and to generate an image of an intended scene and target, the image being based on a portion of the return optical signal;
   a partial aperture obscuration at a second pupil plane, the second pupil plane being an optical conjugate of the first pupil plane, the partial aperture obscuration to block a portion of internal backscatter in the return optical signal; and
   a focal plane to record the image, the image having at least a portion of the internal backscatter blocked, where the partial aperture obscuration is between the imager and the focal plane, and where the partial aperture obscuration includes a shape that overlaps with a portion of the second pupil plane to block the portion of the internal backscatter involving a forward projection of the hole to reach the focal plane.

2. The laser detection and ranging system of claim 1, wherein the transmitter configured to emit a directed optical signal comprises a laser.

3. The laser detection and ranging system of claim 1, wherein a shape of the partial aperture obscuration is based on a shape of the hole.

4. The laser detection and ranging system of claim 1, wherein a location of the partial aperture obscuration is based on a location of the hole.

5. The laser detection and ranging system of claim 4, wherein the hole is off-center relative to a plane of the mirror; and
   wherein the partial aperture obscuration is off-center relative to a cross-section of an optical path of the return optical signal.

6. The laser detection and ranging system of claim 4, wherein the hole is centered relative to a plane of the mirror; and
   wherein the partial aperture obscuration is centered relative to a cross-section of an optical path of the return optical signal.

7. The laser detection and ranging system of claim 1, wherein a size of the partial aperture obscuration is based on a size of the hole.

8. The laser detection and ranging system of claim 1, wherein the internal backscatter comprises near-field backscatter.

9. The laser detection and ranging system of claim 1, wherein the mirror having a hole is an optical conjugate of the first pupil plane.

10. The laser detection and ranging system of claim 1, wherein the mirror having a hole is an optical conjugate of the second pupil plane.

11. The laser detection and ranging system of claim 1, further comprising an afocal foreoptic to increase the optical aperture size and decrease the directed optical signal divergence.

12. A method of obscuring local internal backscatter comprising:
   emitting a directed optical signal through a hole in a mirror, the directed optical signal passing through a shared optical aperture, the shared optical aperture comprising a first pupil plane;
   receiving a return optical signal through the shared optical aperture;
   removing at least some internal backscatter in the return optical signal by positioning a partial aperture obscuration in a second pupil plane, the second pupil plane being optically conjugate to the first pupil plane; and
   recording an image at a focal plane based on the return optical signal having the at least some internal backscatter removed, where the partial aperture obscuration includes a shape that overlaps with a portion of the second pupil plane to remove the at least some internal backscatter involving a forward projection of the hole from reaching the focal plane.

13. The method of claim 12, wherein a shape of the partial aperture obscuration is based on a shape of the hole.

14. The method of claim 12, wherein a location of the partial aperture obscuration is based on a location of the hole.

15. The method of claim 12, wherein a size of the partial aperture obscuration is based on a size of the hole.

16. The method of claim 12, wherein the hole is off-center relative to a plane of the minor; and
    wherein the partial aperture obscuration is off-center relative to a cross-section of an optical path of the return optical signal.

17. The method of claim 12, wherein the hole is centered relative to a plane of the mirror; and
    wherein the partial aperture obscuration is centered relative to a cross-section of an optical path of the return optical signal.

18. The method of claim 12, wherein the mirror is an optical conjugate of the second pupil plane.

19. The method of claim 12, further comprising increasing the optical aperture size using an afocal foreoptic.

20. The method of claim 12, further comprising decreasing the directed optical signal divergence using an afocal foreoptic.

\* \* \* \* \*